(No Model.)
C. M. KNIGHT & T. HAWKEN.
COUPLING FOR ELECTRIC WIRES.
No. 447,833. Patented Mar. 10, 1891.
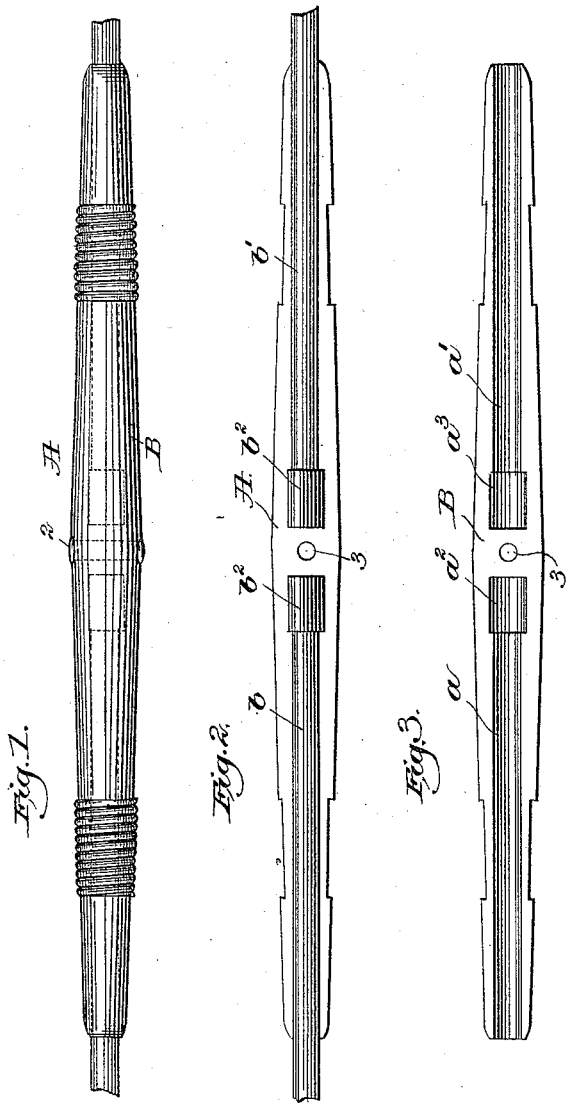

UNITED STATES PATENT OFFICE.

CLIMPSON M. KNIGHT AND THOMAS HAWKEN, OF SALEM, MASSACHUSETTS.

COUPLING FOR ELECTRIC WIRES.

SPECIFICATION forming part of Letters Patent No. 447,833, dated March 10, 1891.

Application filed November 20, 1890. Serial No. 372,020. (No model.)

*To all whom it may concern:*

Be it known that we, CLIMPSON M. KNIGHT and THOMAS HAWKEN, both of Salem, county of Essex, State of Massachusetts, have invented an Improvement in Couplings for Electric Wires, of which the following description, in connection with the accompanying drawings, is a specification, like letters on the drawings representing like parts.

This invention has for its object to improve the construction of couplings for electric-light and other wires.

In accordance with this invention the coupling is composed of two like halves or portions adapted to embrace the wire. The ends of the wire to be coupled are each provided with a bulbous portion. Each half of the coupling has two grooves or passages arranged in alignment to receive the wires, and recesses are formed at the terminations of each groove or passage for the bulbous portion or end of the wire.

The two halves or portions of the coupling are designed to be fastened together by a pin or other suitable fastening and also by wire wound thereon.

The coupling is especially designed to furnish a free and easy guide for a trolley over which it can travel without sparking.

Figure 1 shows in front elevation a coupling embodying this invention; Fig. 2, a front view of one half of the coupling, showing the wire with bulbous ends placed thereon; Fig. 3, a similar view of the other half of the coupling.

The coupling consists of two like halves or portions A B. The portion B (see Fig. 3) is made quite long and slender, and two grooves or passages $a\ a'$ arranged in alignment, and at the adjacent terminations of said grooves or passages deep recesses, as $a^2\ a^3$, are formed. The portion A, as before stated, is made like the portion B. The wires $b\ b'$ are placed in the grooves or passages $a\ a'$, and the ends thereof have bulbous formations, as $b^2$, which enter the deep recesses $a^2\ a^3$. The wires having been placed in proper position, as shown in Fig. 2, the two halves or portions are placed together to embrace the said wires, and a pin 2 is driven through holes 3 formed in the halves or portions, which pin is upset or riveted at its ends. The wires $b\ b'$ are held in place by solder or otherwise, as desired, to insure a good and sufficient contact. The halves or portions A B are reduced in diameter at a point near each end, and at this point the wire is wound around the halves or portions to serve as an additional fastening therefor.

It will be seen that by making the coupling long and slender and slightly tapering, as shown, a free guide is provided for the passage of the trolley, and by the specific construction of the coupling shown the wire will be firmly held in place.

In lieu of the wire wrapper herein shown as a means of fastening the parts together, any other well-known or suitable means may be employed.

I claim—

1. A coupling for electric wires, composed of two like halves or portions A B, each half or portion having two grooves or passages $a\ a'$ arranged in alignment with deep recesses $a^2\ a^3$ at their adjacent ends to receive the wires and bulbous formations thereon, which wires are embraced when the halves or portions are placed together, and fastenings for said halves or portions, substantially as described.

2. A coupling for electric wires, composed of two halves or portions adapted to embrace the ends of the wires, said halves or portions having reduced portions near the ends, and a wire wound around the said halves or portions at said reduced portions, substantially as described.

In testimony whereof we have signed our names to this specification in the presence of two subscribing witnesses.

CLIMPSON M. KNIGHT.
THOMAS HAWKEN.

Witnesses:
FOREST L. EVANS,
D. W. QUILL.